(12) United States Patent
Adam et al.

(10) Patent No.: US 6,707,362 B1
(45) Date of Patent: Mar. 16, 2004

(54) METHOD AND APPARATUS FOR FOCUSING A MAGNETIC FIELD TO TREAT LIQUIDS

(75) Inventors: Les Adam, Cherokee Village, AR (US); Harley Adam, Cherokee Village, AR (US)

(73) Assignee: AZ Industries, Inc., Ash Flat, AR (US)

( * ) Notice: Subject to any disclaimer, the term of this patent is extended or adjusted under 35 U.S.C. 154(b) by 0 days.

(21) Appl. No.: 10/301,915

(22) Filed: Nov. 22, 2002

(51) Int. Cl.$^7$ .............. H01F 7/00; H01F 7/02; B01D 35/06
(52) U.S. Cl. ............. 335/306; 335/301; 335/304; 210/222
(58) Field of Search ................. 335/302–306; 210/222, 695; 123/538

(56) References Cited

U.S. PATENT DOCUMENTS

| 4,568,901 A | 2/1986 | Adam | 335/305 |
| 5,348,050 A * | 9/1994 | Ashton | 137/827 |
| RE35,689 E | 12/1997 | Kulish | 210/220 |

* cited by examiner

Primary Examiner—Ramon M. Barrera
(74) Attorney, Agent, or Firm—Head Johnson and Kachigian

(57) ABSTRACT

A magnetic device having an optimized geometry provides maximum beneficial physical effects of applying a magnetic field to a fluid. The device includes three relatively powerful magnets located radially about a fluid conduit approximately 60° apart from one another. One of the magnets has an opposite pole to the other two facing inwardly toward the fluid conduit. In order to shield electrical equipment near the device, additional magnetic strips are included having poles aligned opposite that of the neighboring, larger magnet. These magnetic strips not only shield nearby electrical equipment, they also serve to better focus the magnetic field.

10 Claims, 4 Drawing Sheets

METHOD AND APPARATUS FOR FOCUSING A MAGNETIC FIELD TO TREAT LIQUIDS

BACKGROUND OF THE INVENTION

1. Field of the Invention

The present invention relates to a new and improved apparatus and method for magnetically treating liquids. More specifically, the present invention may removably and adjustably be attached to a tube having a liquid running through it. The present invention produces a unique magnetic field focused in such a way so as to improve the physical properties of the liquid.

2. Prior Art

It is well known in the art of magnetism that applying a strong magnetic field to a substance changes the direction of the magnetic moments of individual atoms within the substance. This allows scientists to use nuclear magnetic resonance to determine the geometric structures of a variety of organic compounds, including proteins. This technology has also been developed to create magnetic resonance imaging, which has become a vital tool in medical diagnostics.

Over the past several years, magnetism has been applied to liquids to alter their physical nature. Precisely which method of applying a magnetic field to a liquid results in superior physical transformation of the molecules within that liquid has been a hotly debated issue. In some designs, a flexible tubing through which liquid flows is wrapped around a single magnet. Other designs expose a liquid first to a north or south pole and then downstream to an opposite pole. It is also known to use multiple magnets in order to create one or more magnetic fields. For example, the north pole of a magnet may be applied to one side of a conduit while a south pole is applied to the opposite side. This results in a magnetic field that is perpendicular to the rate of fluid flow through the conduit. It is also known to have a plurality of magnets through which fluid flows such that all of the magnets have the same pole facing the conduit. For example, all of the magnets may be aligned such that only their south poles face the fluid conduit. This design may also be reversed such that only the north poles face the fluid conduit. Examples of this design may be found in U.S. Reissue Pat. No. 35,689 and in U.S. Pat. No. 4,568,901.

It has been found that by applying such magnetic fields to a liquid has a number of benefits. Fuels, such as gasoline, diesel fuel and natural gas all burn more efficiently after exposure to a magnetic field. Potable water, alcoholic beverages and other consumable liquids have a superior flavor. Scale is also reduced in metal and other pipes. It is believed that these properties may be enhanced by modifying the geometry and positioning of the magnets used to influence the physical properties of the liquid.

Because of the benefits of exposing a fluid to a magnetic field, it is desirable to use such magnetic devices in a variety of situations. Because the increase in fuel burning efficiency caused by magnetic fields is temporary, such magnetic devices must be located within the car, truck, boat or plane itself. Properties caused by exposing fuel to a magnetic field at a gas station or a refinery would dissipate before the fuel was burned. Unfortunately, vehicles today generally have a substantial amount of electronic equipment, including computer chips. Strong magnetic fields have a deleterious affect on such devices. Therefore, it is necessary to place the magnetic devices on a fuel line close enough to the engine such that the effects of the magnetic field do not dissipate prior to incineration of the fuel. It is also necessary that the magnetic device be far enough from any electronic equipment to avoid damage.

It is therefore desirable to provide a device for applying a magnetic field to a fluid that has been geometrically optimized to maximize the beneficial effects of applying a magnetic field to the fluid.

It is also desirable to provide a device for magnetically treating a fluid that provides only a minimal risk to nearby electrical equipment.

SUMMARY OF THE INVENTION

In the present invention, three magnetic casings are attached to a fluid conduit resulting in a geometrically optimized configuration of the magnets in order to maximize the physical benefits imbued to the fluid. The three magnets are preferably 120° apart from one another. Two of the magnets are oriented such that the same pole faces the conduit. The third magnet has an opposite pole facing the conduit. This results in a uniquely shaped magnetic field that is directed from two magnets into the third. Preferably, the three magnets are attached to one another by means of screws or similar devices connecting flanges that protrude from either side of the magnet casings.

This three magnet configuration is superior to existing methods of applying magnetic fields to fluids. This is because of the method by which the magnetic field affects the fluids.

Fluids such as fuels like gasoline and propane are hydrophobic. Generally, it has been thought that the cohesive properties of such molecules were relatively small. Their hydrophobicity was thought to, by its nature, prevent clustering of like molecules. However, this inner molecular model has been rethought in light of van der Walls forces and temporary dipoles. Those skilled in the art will appreciate that even in hydrophobic molecules, temporary dipoles are created by shifts in electron clouds that surround the molecules. This results in non-polar molecules exhibiting polar behavior. Those skilled in the art will appreciate that fluctuating electrons within one molecule will influence the behavior of electrons in the neighboring molecule. The results of this is nearby molecules having dipoles facing opposite directions. This results in the molecules clustering together.

Those skilled in the art will appreciate that the better a fuel is mixed with oxygen, the more efficiently it burns. Molecules that are clustered have less total surface area with which to react with nearby oxygen molecules. This means that fuel having clustered molecules will not burn as efficiently as fuel having molecules that are evenly distributed. Not only does the fuel burn less efficiently, but more polluting molecules are subsequently emitted into the environment.

The exposure of a fluid, such as a fuel, to a magnetic field causes clustered molecules to separate. Those skilled in the art will appreciate that both hydrogen and nitrogen molecules have an atomic magnetic moment. Physicists generally refer to this as atomic spin. Nearby atoms generally have their nuclear magnetic moments aligned in opposite directions. Just as north poles of magnets repel one another and opposite poles attract one another, atomic spin causes atoms to be attracted to other atoms having opposite magnetic moments and being repelled by atoms having magnetic moments aligned in the same direction. When a fluid is exposed to a strong magnetic field, the result is what physicists refer to as spin-flip. The relatively strong magnetic field causes the magnetic moment of all of the atoms within a fluid to face the same direction. The result is that neighboring molecules are repelled from one another. Exposure to a strong magnetic field, and resultant spin-flip, causes sufficient repelling force to counteract the interactions between temporary dipoles. The molecules of the fuel become evenly dispersed. This improves efficiency of burning the fuel and reduces the amount of pollution emitted.

The configuration of the present invention is superior to those of prior inventions. Its relatively simple design provides an adequate magnetic field to cause molecules to repel one another due to spin-flip. A device having the same pole of each of the magnets facing the fluid conduit essentially creates three separate magnetic fields within the conduit. While this causes molecules within one of the three fields to repel one another, it does not cause molecules in neighboring fields to repel them. The result is regions within the conduit wherein molecules are aligned in three different directions. A significant disadvantage of these "mono-polar" designs are the substantial magnetic field that emanates outwardly from these designs. Just as the inwardly facing poles are the same, the outwardly facing poles are also the same. There are no nearby opposite poles to "pull in" the magnetic fields emanating from the device. This has the disadvantage of interfering and/or damaging nearby electrical equipment. Furthermore, it is relatively inefficient in that it wastes approximately half of the magnetic energy created by the magnets.

The present invention provides means for focusing a magnetic field used to treat a fluid such that more of the generated magnetic field is conserved as well as reducing the risks to nearby electronic equipment.

First, smaller, weaker ancillary magnetic strips may be applied to a monopole design in between the magnets being used. These ancillary magnets are smaller and located on the exterior of the device. This prevents them from substantially affecting the mono-polar qualities of the magnetic field to which the fluid is exposed. This also reduces the magnetic field emanating outwardly from the device.

A more substantial method of reducing the size of the electric field emanating from a device designed to apply a magnetic field to a fluid, is to have one of three magnets aligned in the opposite direction of the other two. This, of course, results in having two poles that extend outwardly from the device to do the same, and the third pole extending outwardly to be different. This design has two advantages. First, the magnetic field applied to the fluid is not only broad, but also unidirectional. One strong field, instead of three or more fields, is applied to the liquid. This results in all of the atomic spins aligning in the same direction. This maximizes intercellular repulsion.

The second major advantage of this design is that it captures the portions of the magnetic field generating outwardly from the device. This essentially provides for recirculation of the magnetic energy, which increases the strength of the field applied to the fluid. This will be further described below.

The magnet casings may have flanges that connect to one another by means of a nut and bolt. This allows for ready and convenient attachment of the present invention to a fuel line or other fluid conduit.

It is therefore an object of the present invention to provide a device for effectively applying a magnetic field to a fluid.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention, the geometry of the magnets used is optimized to create a device that maximizes the benefits of magnetizing a liquid. Although it is especially suitable for magnetizing fuels, such as natural gas, gasoline, diesel and airline fuel, it may also be used to magnetize other liquids. Motor oil and other lubricants exhibit superior performance when routinely magnetized. Similarly, consumable liquids typically have enhanced flavor when the device of the present invention is utilized to apply a magnetic field to them. The present invention may also be utilized to reduce the amount of scaling in a fluid system. In addition, special shielding of the magnetic field is provided by the device in order to better focus the magnetic field. This results in a greater portion of the magnetic field generated by the magnets to be applied directly to the fluid and not the surrounding area. This makes the device especially suitable in devices and environments in which electronic equipment is located. Specifically, it is especially useful for use in automobiles, trucks, boats, and airplanes.

In the preferred embodiment, the present invention consists of three magnets, each within its own casing. These casings are adjustably and removably attached to one another such that the device may snuggly fit about conduits of differing diameters.

Figure 1:
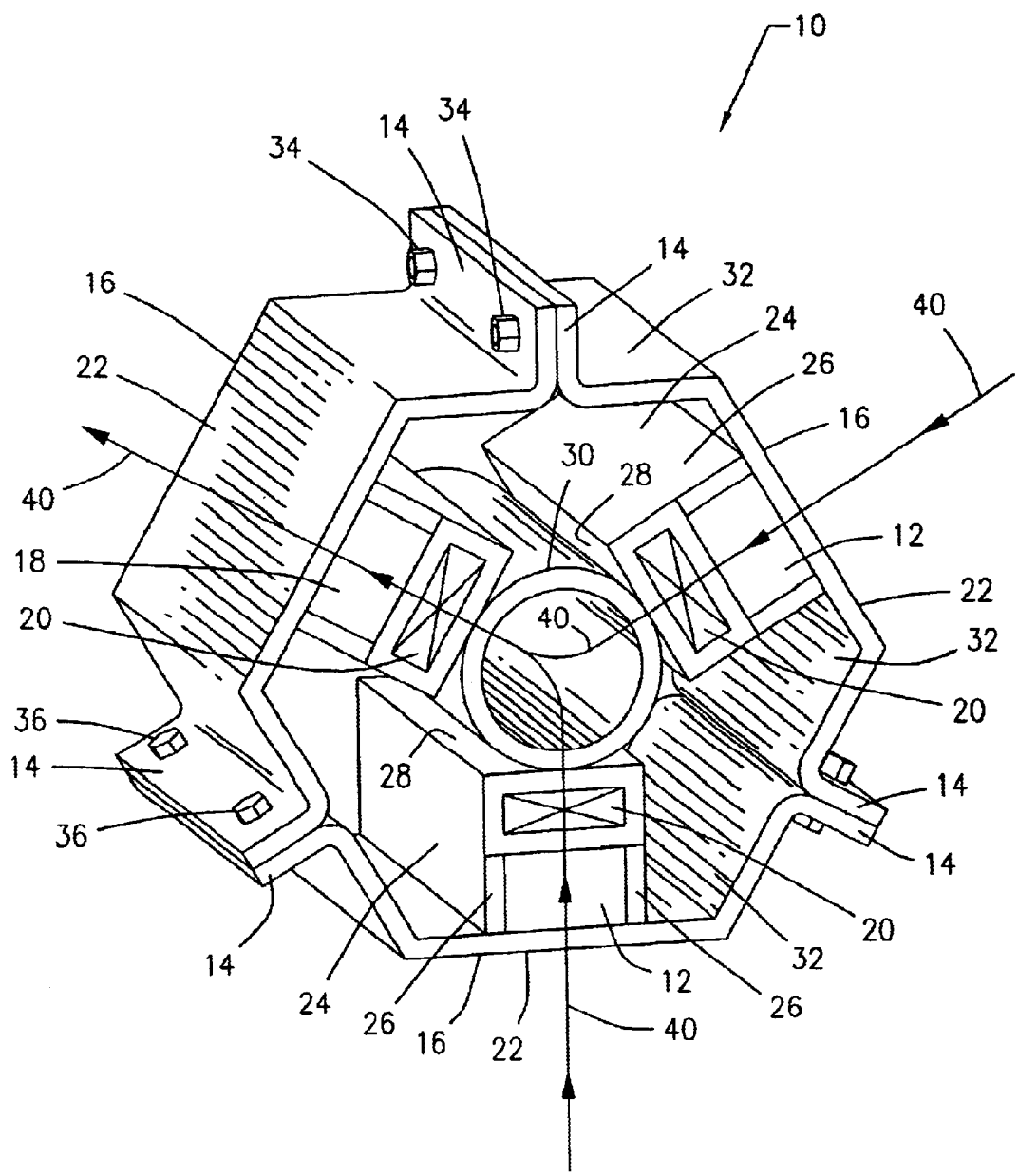
FIG. 1 is a diagrammatic perspective view of the present invention.

FIG. 1 shows a diagrammatic perspective view of the present invention. In this particular embodiment, magnetic field application device 10 is comprised of three magnet casings 16. Each magnet casing 16 is comprised of a frame 22, magnet compartment 24 and magnet 12 or 18. Each casing 22 has a sidewall 32 and a flange 14 upon two opposite sides. The magnet compartment 24 and magnet 12 or 18 is located in the central region of the casing frame 22. Casing 16 have been connected to one another by flange nuts 34 and flange bolts 36 that penetrate adjacent flanges and hold them to one another. Flange nuts 34 are preferably self-locking. Those skilled in the art will appreciate that nuts may be purchased any number of places having a Teflon region that holds them in place regardless of how far down a bolt stem they are screwed. These are preferred in the present invention. However, those skilled in the art will appreciate that there are other methods of adjustably attaching two flanges.

Magnet compartments 24 comprised of sidewalls 26 and interior wall 28. Compartments 24 also have securing walls 20 that hold magnets 12 and 18 in place. Magnets 12 are each aligned so that the same pole is facing conduit 30. In this particular embodiment, magnets 12 have south poles facing conduit 33. In contrast, magnet 18 has its north pole facing conduit 30. This results in the magnetic field having a V-shape as shown by field line 40. This configuration may also be reversed so that magnet 18 has its southern pole facing conduit 30 and magnets 12 have their north poles facing conduit 30. The resulting field illustrated by field line 40 maximizes the influence of the magnets upon the fluid within conduit 30. The combination of the generally 2:1 ratio between poles applied to the conduit, as well as their unique spacing, create a unique magnetic field pattern. This is one of the novel elements of the present invention.

As can be seen in FIG. 1, support walls 20 do not need to cover the entire end of magnets 12 and 18. Support walls 20 only need to extend far enough to ensure that the magnets are securely held in magnet compartments 24.

Magnets 12 and 18 are preferably permanent magnets. Although electromagnets maybe used, this requires an electrical power source. Using permanent magnets makes the device much easier to operate. The casing frame and walls of the magnet compartment may be comprised of any of a variety of materials. Preferably steel or other metal is used because of its superior strength. Other materials, such as plastics, may be used, but are not preferred as they more easily break. As long as the casing is magnetically transparent and sufficiently strong, it should suffice.

For clarity, FIG. 1 does not show the means by which the magnet compartment is attached to the casing. Those skilled in the art will appreciate that there are a variety of methods. It may be welded, spot welded, brased, screwed, bolted, riveted or attached by other methods known in the art.

Because of the present invention's unique design, a single magnetic field is evenly distributed across the fluid conduit. Monopole systems generate opposing fields and do not cause molecules to repel each other as effectively. Because this system uses three magnets instead of two opposing magnets, a broader magnetic field is created within the conduit that evenly distributes the field across the fluid.

Figure 2:
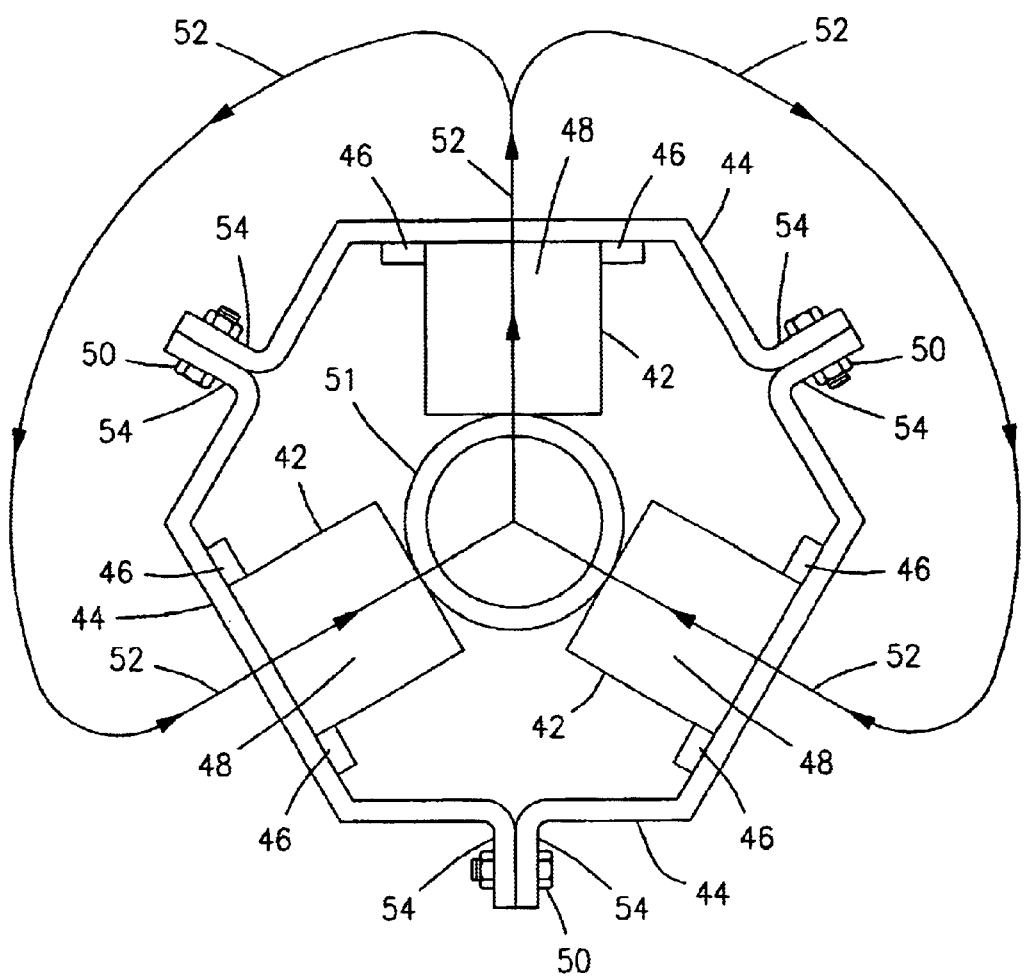
FIG. 2 is a diagrammatic front view of the present invention.

FIG. 2 shows an embodiment of the present invention from a diagrammatic front view. In this embodiment, magnet compartments 42 attach to magnet casings 44 by welding wings 46 onto casing 44. Wings 46 are a part of magnetic casing 42.

The embodiment shown in FIG. 2 also has securing walls 48 that cover an entire side of the magnet (not shown). The embodiment in FIG. 2 illustrates one of many ways to attach magnet compartment 42 to magnet casing 44.

Fluid conduit 51 is exposed to magnetic field 52 by the magnets of the embodiment. The embodiment of FIG. 2 also shows attachment means 50 for removably, adjustably connecting flanges to one another. Connecting means 50 may be any means known in the art to connect flanges 54 and adjust the distance between them.

In FIG. 2, the magnetic field 52 may also be seen. It forms a y-shape in the middle of conduit 51 and because of the bidirectional nature of the three magnets, the generated magnetic fields form a pair of loops about the device. This draws the emanated field closer to the device and prevents spreading of the magnetic field very far from the device itself This also serves to strengthen the field that is applied to conduit 51.

Although the field applied to the conduit is not expressed as a straight line, but rather a v-shaped field, those skilled in the art will appreciate that this is essentially unidirectional. Those skilled in the art will also appreciate that this design ensures that all of the fluid and all of the regions of the conduit are exposed to a magnetic field of sufficient strength. Because the externally projecting energy of the magnets is drawn back into the device by exterior, opposing poles, this field is even stronger.

Figure 3:
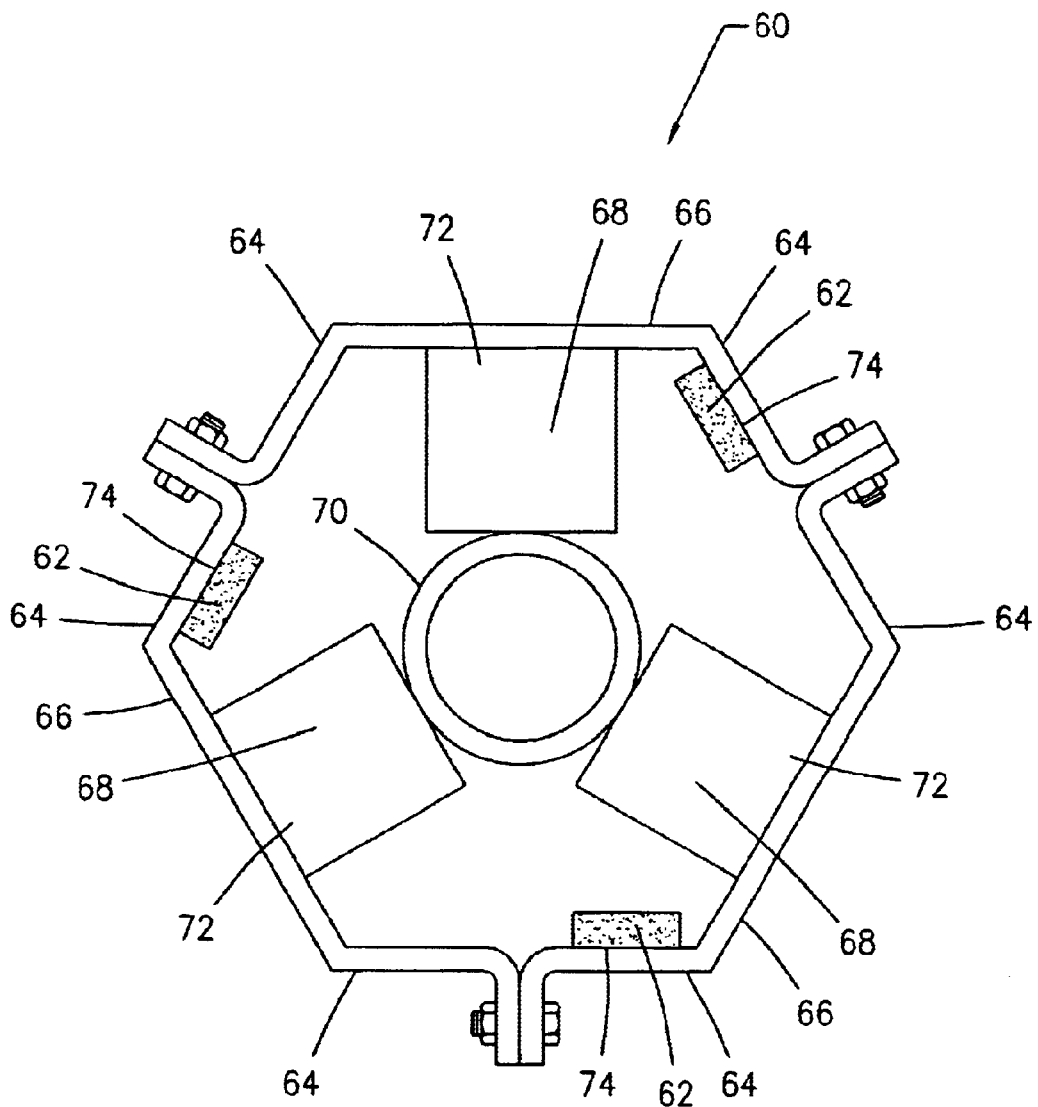
FIG. 3 is a diagrammatic front view of an alternative embodiment of the present invention.

FIG. 3 shows a diagrammatic front view of an alternative embodiment of the present invention. In this particular embodiment, magnets 68 are all aligned in the same direction such that the same poles on each of them face conduit 70. Focusing strips are also shown. Focusing strips 62 are located on sidewalls 64 of casing 66. As can be seen, only half of sidewalls 64 have magnetic focusing strips 62 on them.

One of the advantages of this design is not only an optimized magnetic field but also the narrowing of the field extending out from the device. Because the device has both poles facing inward, it therefore obviously also has both poles facing outward. These outward facing poles draw in the magnetic field. This greatly reduces the amount of magnetic field emanating outward from the device.

In existing devices wherein similar poles all face in an inward direction, there is nothing to direct the fields generated by the outwardly facing poles back into the device. This results in a substantial magnetic field emanating from all sides of the device. Those skilled in the art will appreciate that this may substantially interfere with nearby electrical equipment. In other designs, magnets are aligned approximately 180° from each other such that differing poles face the inside of a fluid conduit. Although these designs have opposing magnetic poles facing outwardly, they are generally too far away from one another to effectively shield nearby devices. The closer proximity of the outwardly facing poles of the present invention allow them to interact so that nearby electrical equipment is effectively shielded.

Figure 4:
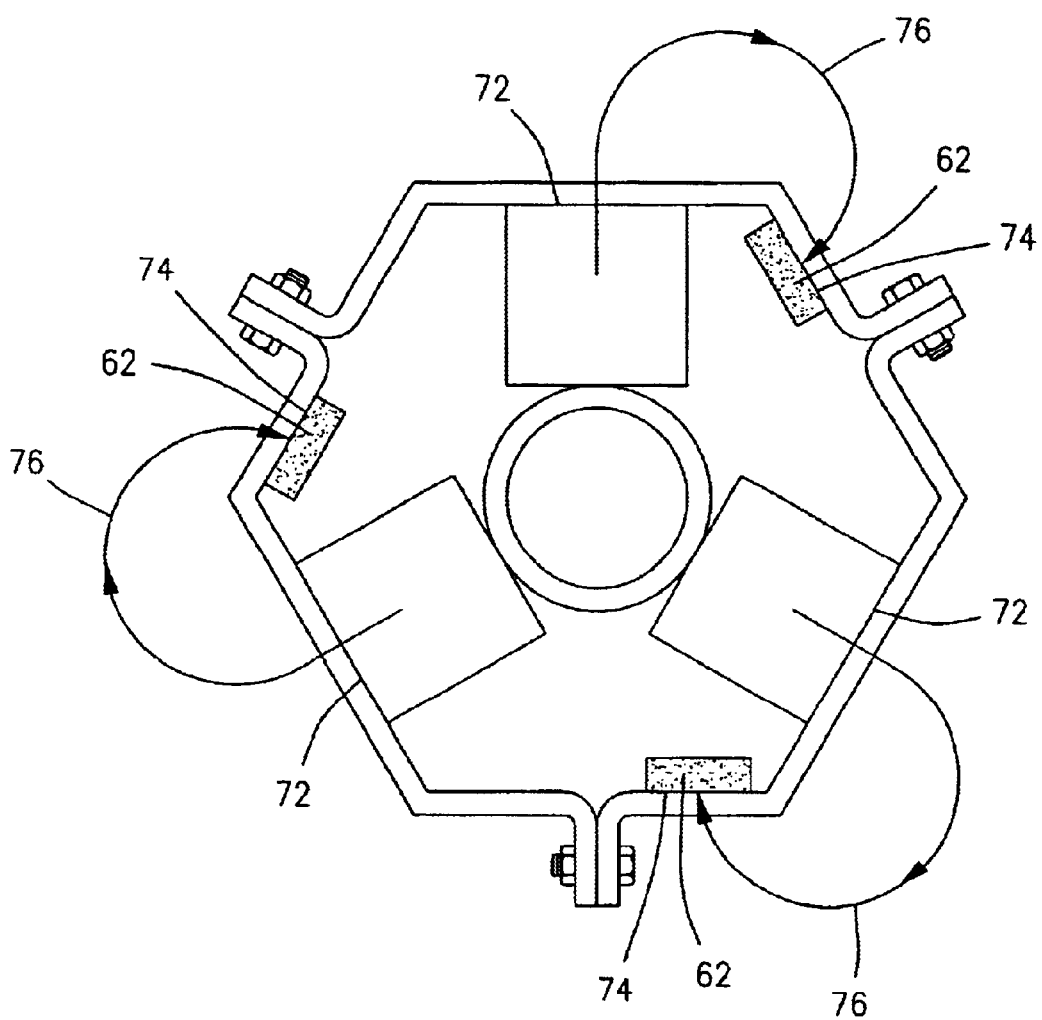
FIG. 4 is a diagrammatic front view of an alternative embodiment of the present invention.

The design shown in FIG. 3 is an embodiment that effectively shields a monopole device in which all primary magnets 68 have the same pole facing fluid conduit 70. This results in the opposite pole 72 of each magnet emanating an unchecked magnetic field. Ancillary magnetic strips 62 have an outward facing pole 74 that is opposite to poles 72. Poles 74 interact with poles 72 to draw the field generated back toward the device 60. This interaction can be more clearly seen as magnetic field lines 76 in FIG. 4. This figure more clearly illustrates the interaction between poles 72 and ancillary magnetic strips 62. Magnetic field lines 76 show how the exterior facing poles 72 generate a magnetic field that is then at least partially drawn to opposing pole 74 of magnets 62. Of course, those skilled in the art will appreciate that ancillary magnets 62 are not needed for a magnetic device as shown in FIGS. 1 and 2. Because of the relative strengths of the magnets, the embodiment shown in FIGS. 1 and 2 generally better shield the device and emanates a weaker electric field outwardly.

Whereas, the present invention has been described in relation to the drawings attached hereto, it should be understood that other and further modifications, apart from those shown or suggested herein, may be made within the spirit and scope of this invention.

What is claimed is:

1. A device for applying a shielded magnetic field to a fluid in a conduit comprising:
    three magnetic casings;
    at least one magnetic compartment attached to each of said magnetic casings; and
    wherein the three magnetic casings are attached to one another in order to substantially surround the conduit having fluid in it and arranged so that two of the magnets are aligned such that the same pole faces the fluid conduit and the third magnet is aligned such that the opposite pole is aligned such that it faces the fluid conduit.

2. The device of claim 1 wherein the magnetic casings further comprise attachment flanges and are connected to one another by nut and bolt mechanism through the flanges.

3. The device of claim 2 wherein the bolt is a self-locking bolt.

4. The device of claim 1 wherein the magnet compartments comprise an interior wall, two side walls, two securing walls and a magnet.

5. The device of claim 4 wherein the magnets are permanent magnets.

6. The device of claim 1 wherein two of the magnets are aligned so that their south poles face the fluid conduit, and the third magnet is aligned so that its north pole faces the fluid conduit.

7. The device of claim 1 wherein the magnetic casings are comprised of steel.

8. The device of claim 1 wherein the magnetic compartments are attached to the magnetic casings by means of spot welding.

9. A device for focusing a magnetic field upon a fluid conduit comprising:

three magnetic casings each having two sidewalls;

three magnetic compartments, each attached to one of the magnetic casings and comprising a magnet;

at least one ancillary magnetic strip on at least one of the sidewalls of the magnetic casing; and wherein the magnetic casings attach to one another such that they surround a fluid conduit.

10. The device of claim 9 wherein the magnets are all aligned such that a single pole is facing the fluid conduit and all of the ancillary magnetic strips have an opposite pole facing the fluid conduit.

* * * * *